US011087351B2

United States Patent
Hage

(10) Patent No.: US 11,087,351 B2
(45) Date of Patent: Aug. 10, 2021

(54) SYSTEM AND METHOD FOR MANAGING E-COMMERCE

(71) Applicant: FreeCause, Inc., Boston, MA (US)

(72) Inventor: Antoine Hage, Montreal (CA)

(73) Assignee: RAKUTEN USA, INC., San Mateo, CA (US)

( * ) Notice: Subject to any disclaimer, the term of this patent is extended or adjusted under 35 U.S.C. 154(b) by 529 days.

(21) Appl. No.: 14/625,294

(22) Filed: Feb. 18, 2015

(65) Prior Publication Data

US 2016/0239861 A1    Aug. 18, 2016

(51) Int. Cl.
    *G06Q 30/02*    (2012.01)
(52) U.S. Cl.
    CPC ............................... *G06Q 30/0233* (2013.01)
(58) Field of Classification Search
    CPC .......... G06Q 30/0206; G06Q 30/0201; G06Q 20/209; G06Q 50/12; G06Q 30/0222; G06Q 30/0282; G06Q 30/0251; G06Q 30/0269; G06Q 30/0631; G06Q 30/0255; G06Q 30/0236; G06Q 30/0207
    See application file for complete search history.

(56) References Cited

U.S. PATENT DOCUMENTS

| | | | |
|---|---|---|---|
| 7,698,185 B2 | 4/2010 | Hofer et al. | |
| 7,844,481 B2 * | 11/2010 | Hilbush | G06Q 10/06311 705/7.13 |
| 8,438,052 B1 * | 5/2013 | Chanda | G06Q 30/0282 705/7.11 |
| 8,533,083 B2 | 9/2013 | Hofer et al. | |
| 2003/0144914 A1 * | 7/2003 | Gossard | G06Q 30/06 705/26.8 |
| 2012/0078731 A1 * | 3/2012 | Linevsky | G06Q 30/0603 705/14.73 |
| 2013/0268342 A1 * | 10/2013 | Tune | G06Q 30/0207 705/14.29 |
| 2016/0335707 A1 * | 11/2016 | Ranasinghe | G06Q 30/0633 |

* cited by examiner

*Primary Examiner* — David J Stoltenberg
*Assistant Examiner* — Michael J Cross
(74) *Attorney, Agent, or Firm* — Troutman Pepper Hamilton Sanders LLP

(57) ABSTRACT

Disclosed herein includes a system and method for providing an online shopping platform. A memory may store a user's loyalty points for redemption. The platform may display lists of goods for sale provided by different merchants. A user may place a purchase order for a product offered by a first merchant. The purchase order may also include another product offered by a second merchant. The system and method may calculate a total cost of the purchase order. The system and method may deduct at least a portion of the loyalty points available in the user's loyalty account in exchange for a currency value. The system and method may reduce the cost of the purchase order by the currency value.

27 Claims, 15 Drawing Sheets

SYSTEM AND METHOD FOR MANAGING E-COMMERCE

TECHNICAL FIELD

The present technology relates to an online shopping platform that facilitates the promotion and sale of products in a shopping mall type environment. In particular, the novel online shopping platform includes both unique computer systems and programming methods that provide an enhanced shopping experience—an experience that emulates a shopping village or mall of diverse retail stores permitting a shopper to discover and buy products from different merchants but in a single transaction via one or more payment methods including payment in the form of loyalty program points.

BACKGROUND

Many merchants have implemented ecommerce business models to create online shopping experiences for their customers. The vast array of current ecommerce approaches generally falls into two main designs: A direct channel model and affiliate marketing model. The direct channel model refers to marketplaces or online stores that are fully constructed and include all the various features necessary for online shopping at a single site. This includes order entry, a shopping cart, credit check and fulfillment resources. These operations collectively support user purchases on site. A direct site handles ecommerce for visitors to the merchant portal directly for this business.

There are many aspects of design associated with the direct channel model. A fully operational web store is expensive to build and maintain; and extremely difficult to cohesively integrate with additional stores into a shopping mall having a distinct "look and feel" for seamless shopping. Additional problems reside in the difficulty in recruiting established online retailers, retaining consumers that visit the first store and to establish a separate "brand" for the composite mall. While some solutions have been attempted (See U.S. Pat. No. 7,305,355—the contents hereby incorporated by reference herein), little progress has been made with this approach. All these factors drive up the cost of the direct channel model, which makes it challenging to compete in a mature market like the Americas.

The affiliate marketing model refers to a system that requires some customer navigation that begins on a site remote from the ecommerce merchant site; that is, where access to the merchant site starts by clicking on the remotely located linking instructions on a web page not necessarily affiliated with the Merchant. There are issues associated with this model that limit its value. For instance, consumers often cannot complete a purchase all in one platform or shopping location. Further, consumers lack any incentive to remain on site; and can easily navigate away to unaffiliated locations—thus lost to the original merchant. Furthermore, affiliate linking requires commissions to be paid by the merchant. As a result of these and other issues, the affiliating marketing model is gradually fading in use.

The growing use of proprietary loyalty programs that are found in commerce has created additional issues and complexities. Loyalty programs include various reward currencies from companies such as American Express, JetBlue, and Delta Airlines. Vendor-specific loyalty programs encourage purchases by the consumers but typically include significant restrictions regarding goods that can be purchased, the location of these outlets that provide these goods and the process in exchanging points for goods. Indeed, the overall value of rewards currency is greatly diminished by various restraints and encumbrances applied to these currencies inhibiting the quality of the consumers' shopping experience. For example, many reward currencies can only be redeemed through a limited redemption site operated by the originating vendor of the points. These sites often are limited to out of date stock or similarly less popular items.

In recent years, ecommerce has grown to international dimensions—with participating shoppers originating from many different countries. While major merchants support worldwide sales, domestic sites are often limited to deliveries to domestic addresses. This is a very difficult barrier to visiting shoppers desiring direct shipment to addresses outside the domestic market. It is a barrier that cannot be overcome by many oversea consumers—shoppers that are simply prevented from purchasing from these retailers.

In view of the foregoing, there exists a need for an effective online shopping platform that addresses many problems discussed above. For instance, it is desirable to have an effective online shopping platform that can be easily integrated with already established online retailers. There also exists a need to enhance a user's online shopping experiences by expanding the value and usage of vendor-specific loyalty points. It is also desirable to enhance the user's online shopping experiences by enabling international deliveries, displaying product prices in international currencies, and accepting multiple currency payments.

SUMMARY

The present technology relates to a system, apparatus, and method for providing an online shopping platform. The platform will replicate a shopping village or mall in operation but in an online environment. This allows for shopping of multiple merchants but in a social and personalized manner that reflects actual shopping trips by consumers. By using multiple merchants that canvas a large profile of products, traffic will be increased to all of the participating stores. Expanded access will be accomplished by facilitating purchases using one or more—or even multiple types at once—of reward currencies in lieu of cash or credit cards. The site will support multiple customized widgets to facilitate operation. Supporting international transactions and deliveries expands the user base further. A specific API is provided to allow the simplified integration of existing merchant sites by registering the site specific DNA for each merchant. This supports a single product feed for all participating merchants.

Additional features will include a white label marketplace for reward program point redemption, the ability to support partial/split payments using currencies and reward points, operational enhancements such as a functional wish list and real time product recommendations from multiple merchants. A Portal, based on SaaS (Software as a Service), is provided to both the administrator and to the clients to manage client product offerings—including promotions, pricing and sales—and to monitor operations. The Portal will support several Report and Analytics generation functions (e.g. traffic) and automate change implementation for each store. Manual operations will be supplemented with automated (algorithm controlled) system adjustments.

Various aspects of the described illustrative embodiments may be combined with aspects of certain other illustrative embodiments to realize yet further variations. It is to be understood that one or more features of any one example may be combined with one or more features of the other example providing the building blocks for a customized operation. Other features of the technology will be apparent from consideration of the information contained in the following detailed description.

BRIEF DESCRIPTION OF THE DRAWINGS

The accompanying drawings, which are incorporated herein and constitute a part of this specification, illustrate embodiments of the present disclosure and, together with the detailed description of the embodiments given below, serve to explain the principles of the disclosure. For simplicity and clarity of illustration, like reference numerals may be used in the drawings to identify identical or analogous structural elements.

DETAILED DESCRIPTION

The present technology relates to an online shopping platform where users may shop much like they do at a retail "brick and mortar" mall, neighborhood or village by wandering in and out of distinct retail stores to explore sales and merchandise options. This same process is accomplished online, where a shopper will discover and buy products from different retailers—but over the Internet at a site that not only emulates the shopping village but does this in a streamlined, simplified shopping environment. The system design allows multiple purchases to be handled in a single transaction and in accordance with one or more payment methods that further includes the option of using the shopper's loyalty program points for payment. The online shopping experience is structured so that the process is on a social and personalized platform where users shop from multiple merchants seamlessly. For example, users may redeem points gained from various loyalty programs on the platform to purchase goods from any of the merchants in the mall regardless of the vendor of the reward currency to be used. Shoppers may also earn, redeem, combine and convert points earned at the online shopping platform along with other loyalty program currencies held in their respective accounts.

In one aspect, the online shopping platform may include an online shopping mall. The platform may have a collection of merchants, traders or vendors with different or similar offers of goods or services. The platform may have a multi-vendor checkout system where retailers sell merchandise in one site. The platform may maintain an online shopping cart to collect goods selected by a user from different vendors for purchase, in order to simulate a traditional retail shopping experience. A user may checkout purchased goods in a single transaction at a checkout webpage offered by the platform.

Figure 1:
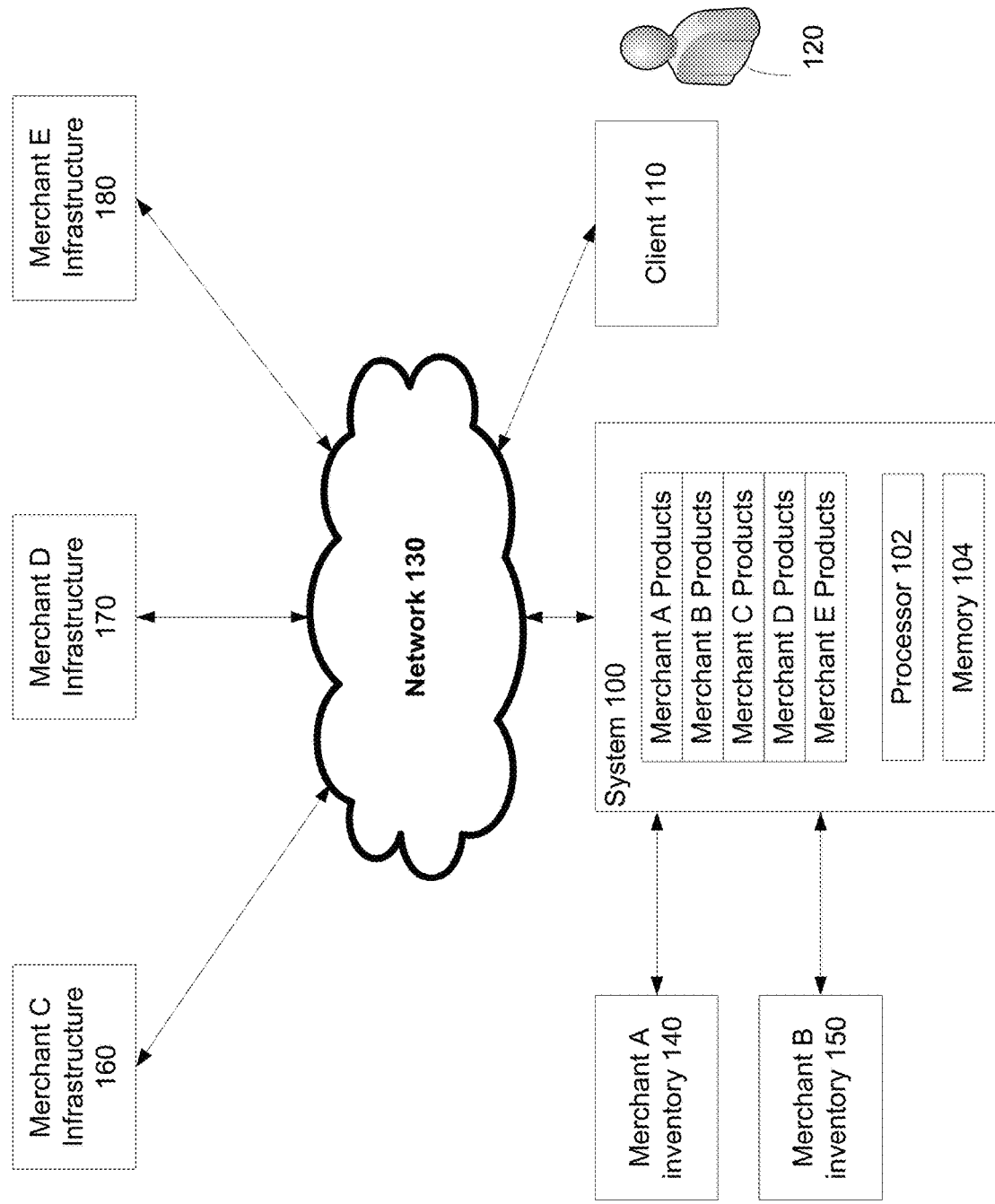
FIG. 1 shows an illustration of the environment for the present technology.

In one embodiment, the online shopping platform may be implemented by a system 100 as illustrated in FIG. 1. The system 100 may be a general purpose or special purpose computing system. The system 100 may include, but is not limited to, one or more of the following: a server, a personal computer, a mobile device, a smart phone, a tablet PC, a multiprocessor system, a microprocessor-based system, a set-top box, a programmable consumer electronic, a network PC, a minicomputer, a mainframe computer, a hand-held or laptop device, and a PDA, among other possibilities. The selection of the platform will depend on the nature of the implementation of the shopping system, and the client demands in terms of bandwidth and processing speed.

The system 100 may include one or more of the following components, a processor 102 and a memory 104. One or more of these components may be operatively connected with each other via wireless communication, physical coupling and/or electrical coupling, such as with a bus. One or more of these components may transmit or receive executable instructions in analog or digital signals to or from one or more of other components.

The processor 102 may control operations of the system 100. The processor 102 may refer to a single processor or a collection of processors including one or more of the following: central processing unit (CPU), microprocessor, digital signal processor, coprocessor, data processor, and analog signal processor, among other possibilities. The processor 102 may be implemented with one or more application specific integrated circuits (ASICs). In some aspects, the processor 102 may be physically mounted within the system 100. Alternatively, the processor 102 may be located remotely from the system 100, and may communicate with the system 100 via a network. When there are a collection of processors, one or more processors may be physically mounted within the system 100, while the remaining processors may communicate remotely with the system 100 via a network.

The memory 104 may store programmable instructions executed by the processor 102. The memory 104 may include a volatile memory, a non-volatile memory, or a combination thereof. In one example, the memory 104 may maintain account information specific to each user. For instance, the account information may include one or more of the following information: a user's basic profile including a user ID, the user's contact information including phone number, home address, billing address, shipping address, credit/debit card information, one or more loyalty program accounts that the user is registered with, and loyalty points associated with each loyalty program available for redemption. Each user's account may maintain a wish list to keep track of products within the user's interest, but not purchased. Each user's account may also include a shopping cart to keep track of products to be purchased by the user.

With continued reference to FIG. 1, the system 100 may operate in a networked environment and communicate with one or more remote computers. By way of example, the system 100 may communicate with a client computer 110 via a network 130. The client computer 110 may be any type of mobile device or computing device, such as a personal computer, a mobile device, a smart phone, a tablet PC, a multiprocessor system, a microprocessor-based system, a set-top box, a programmable consumer electronic, a network PC, a minicomputer, a mainframe computer, a hand-held or laptop device, and a PDA, among other possibilities. The client computer 110 may be operated by a user 120. The user 120 may perform online shopping or view online advertisements via the client computer 110.

The network 130 may include, but not limited to, the Internet, intranets, one or more local area networks (LAN) and one or more wide area networks (WAN), among other possibilities.

With continued reference to FIG. 1, the system 100 may maintain a website to display and sell merchandise offered by a collection of merchants. As shown in FIG. 1, the collection of merchants, e.g., Merchants A-E, may offer various goods or services. These merchants may be direct or affiliate; some with standalone web portals in place; others without. Products offered by the merchants may be associated with one or more of the following: a Universal Product Code (UPC) and a Stock-Keeping Unit (SKU), among other possibilities.

Some of the merchants, such as Merchants A and B, may not operate any vendor-specific ecommerce websites. Such merchants do not have an online retail webpage to sell their merchandise. These merchants may list their products for sale on the platform offered by the system 100. Each merchant may provide one or more of the following information to the system 100, including an inventory list 140 or 150 of items for sale, catalogues, shipment information, and payment information. These merchants may communicate with the system 100 via a website implemented with JavaScript tags. The merchants may sell their goods on the online shopping platform maintained by the system 100 on a consignment basis.

With continued reference to FIG. 1, other merchants, such as Merchants C, D and E may each have an existing vendor-specific ecommerce infrastructure 160, 170 or 180. Such merchants may include, for example, JetBlue, Macy's, and BestBuy, among many others. These merchants may each have an existing website specifically designated to sell its products. The system 100 may display on its website merchandise offered at the existing ecommerce infrastructure. In one embodiment, the system 100 may integrate with one or more existing ecommerce infrastructures by relying on one or more application program interfaces (APIs). An API may include a set of routines, protocols and tools for building software applications. In one embodiment, an API may wrap around an ecommerce web page, such as a Macy's page.

Figure 2:
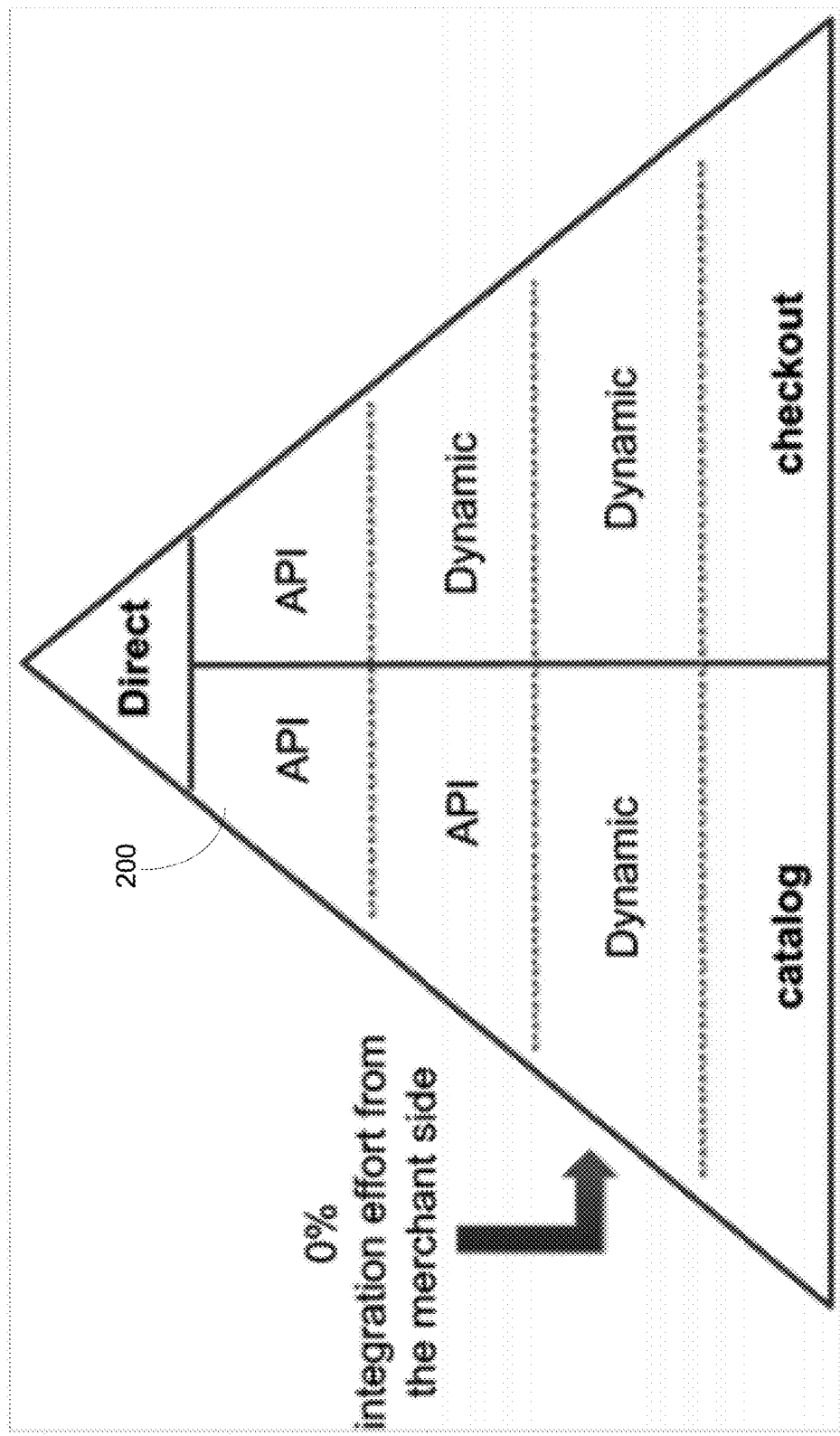
FIG. 2 illustrates a dynamic ecommerce pyramid reflecting system variations according to one aspect of the present technology.

FIG. 2 provides an explanatory diagram of functional combinations of system 100 focusing on integration with various online merchants based on the level of coordinated operation. Two operations are illustrated as two verticals and listed on the bottom layer—catalog and checkout. The top triangle indicates operation for direct merchants—merchants that integrate using either API or dynamic protocols. The direct merchants that connect to the mall with APIs for both catalog and checkout operations, are listed. These require some meaningful customization, but are vastly easier than building a standalone web market for each merchant. On the next layer, a split merchant involves an API for catalog but applies the system supplied dynamic (in effect, command translation software) to the checkout, using e.g., mall DNA to seamlessly integrate this functionality. Finally, the last layer in the triangle indicates a merchant that is fully enmeshed into the mall using dynamic integration (DNA) for both checkout and catalog operations. In this illustration, the merchant can integrate into the mall without a significant investment into the software that supports operation.

Figure 3:
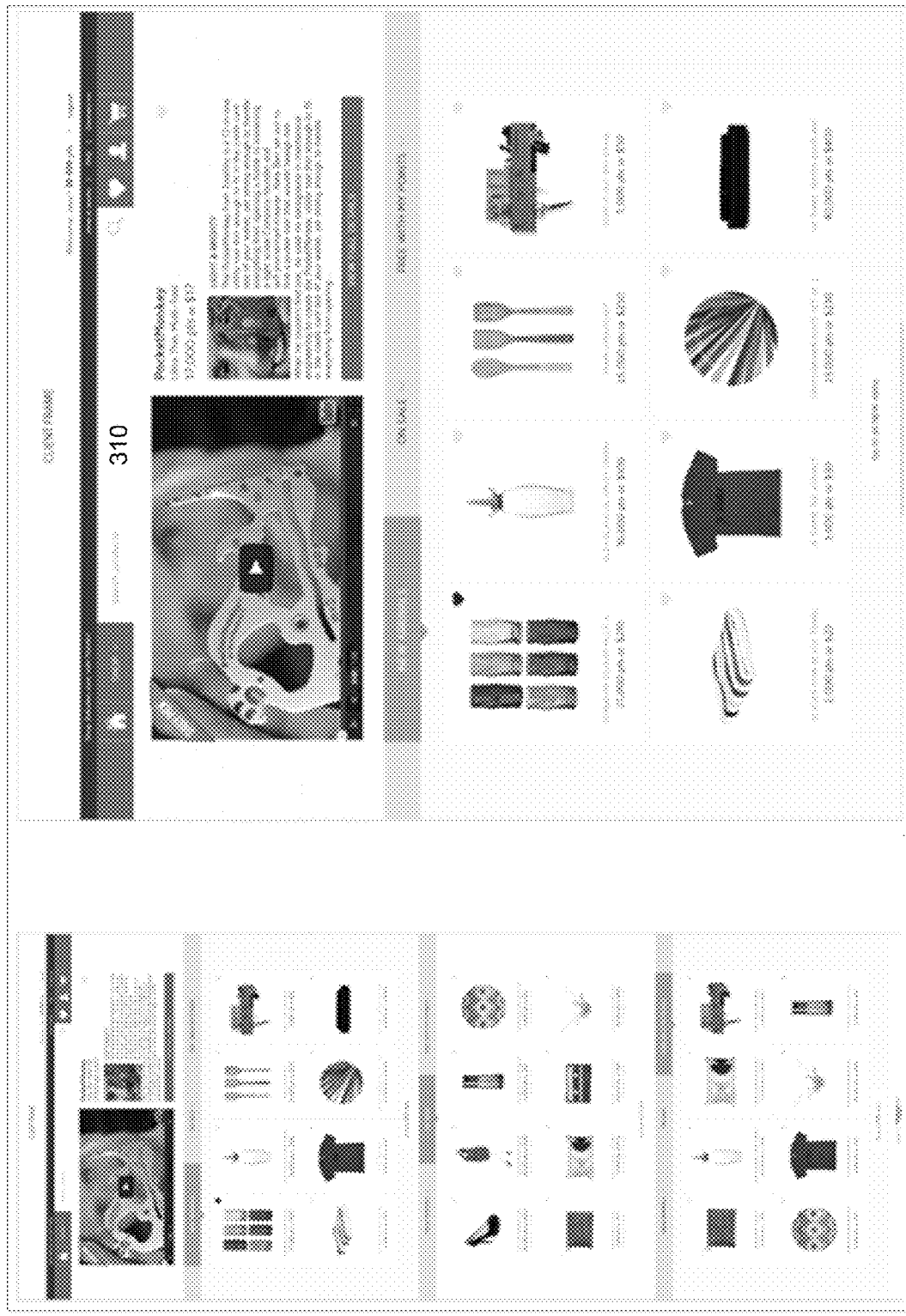
FIG. 3 illustrates a web page frame that displays product information according to one aspect of the present technology.
Figure 4:
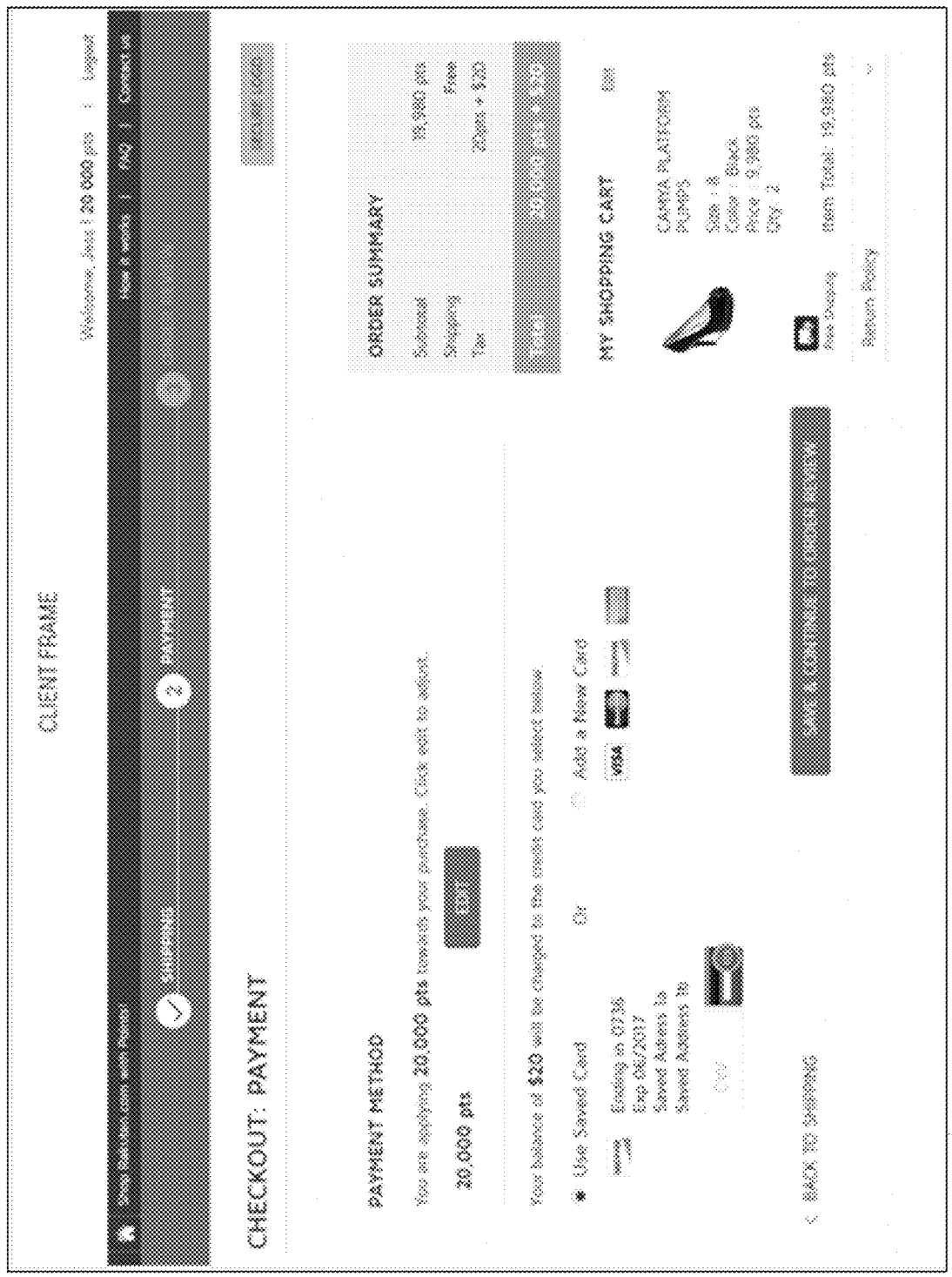
FIG. 4 illustrates a web checkout page maintained by the system according to one aspect of the present technology.
Figure 5:
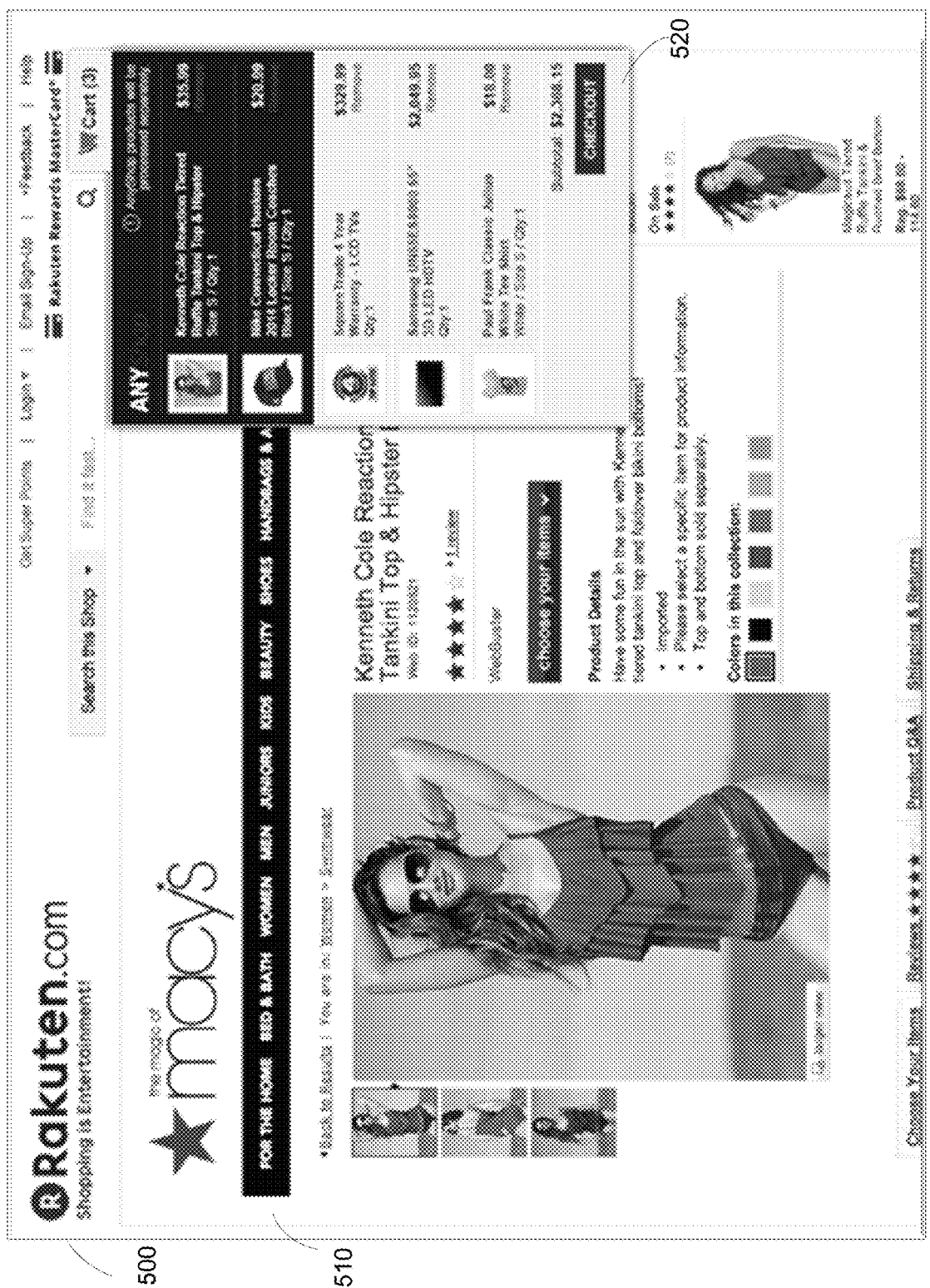
FIG. 5 illustrates a web page that supplements an existing ecommerce web page according to one aspect of the present technology.

FIGS. 3-5 are exemplary web pages supported and/or provided by the system 100. For instance, FIG. 3 displays a webpage 300 maintained by the system 100 that displays product information provided by one or more merchants, such as direct merchants. Here, the system 100 may offer a white labeled marketplace featuring products offerings. As shown in FIG. 3, the webpage 300 may include a search bar 310 at the top of the webpage to allow a user to discover products in the marketplace by searching for any products of interest. In addition to the search bar 310, a user may browse products by choosing from one or more of the following options: "New Arrivals," "On Sale," and "Free with My Points," among other possibilities. Products listed under "New Arrivals" may refer to products recently listed by merchants. To implement offerings based on points, the system links to the user points account(s) and converts these balances into one or more selections at the reference pricepoint.

Products listed under "On Sale" may refer to products that are sold at a discount price. Products listed under "Free with My Points" may refer to products that each may be paid off to its entirety by using a user's current possession of loyalty points, without incurring any further charges. As seen in FIG. 3, for each product, the webpage 300 may display one or more of the following: a product name, a brief description, a representative image or video of the product, the product price, and a number of loyalty points equivalent to the product price.

A user may or may not log into the user's account when browsing products. As shown in FIG. 3, if a user logs into the account, the webpage may display a total number of loyalty points available to the user for redemption. Each user account may maintain a wish list and a shopping cart. For a product of interest, the user may add the product to its wish list. Alternatively, the user may add the product to the user's shopping cart. When the user is ready to checkout, the user may pay one or more products sold by one or more different merchants by credit card, loyalty points, or a combination thereof. For instance, the user may pay off an entire purchase order using a credit card, such as a Visa, MasterCard, Discover, or American Express card, among other possibilities. Alternatively, the user may pay off the entire purchase order with the user's loyalty points. In another alternative, as illustrated in FIG. 4, the user may make a partial payment with the loyalty points, and pay the remaining balance with the credit card. FIG. 4 displays a checkout page 400 of a purchase order. Here, the checkout page 400 may inform the user a maximum number of loyalty points that may be redeemed for the purchase. In the case as illustrated in FIG. 4, the maximum number of loyalty points is 20,000 points. If the user does not wish to redeem the maximum number of loyalty points, the user may have an option to adjust the number of loyalty points for redemption. In the case as illustrated in FIG. 4, the user may adjust the number of loyalty points for redemption by clicking an "EDIT" button. If the total number of loyalty points applied to the purchase is less than the total cost of the purchase, the user may need to pay the remaining balance by credit/debit card.

FIG. 5 illustrates an exemplary web page 500 maintained by the system 100. The web page 500 may wrap around an existing ecommerce web page 510, such as a Macy's page displaying merchandise for sale. The web page 500 may be external to the ecommerce web page 510. The webpage 500 may supplement the existing ecommerce web page 510 with additional features offered by the system 100. The web page 500 may be an API surrounding an ecommerce infrastructure, e.g., the ecommerce web page 510. In some embodiments, the ecommerce web page 510 may be changed to conform to a style or function of the web page 500 managed by the system 100. By way of example, the Macy's page 510 may be changed to conform to a style or function of the web page 500 of Rakuten.com. A user may navigate through one or more ecommerce web pages at the web page 500 maintained by the system 100. For example, when the user navigates from a first ecommerce web page of a first merchant, e.g., Macy's, to a second ecommerce web page of a second merchant, e.g., BestBuy. The web page 500 may dynamically change its content contained therein. For instance, the web page 400 may refresh itself to display and supplement the second ecommerce web page. Additional features may include the use of recommendations of products from other merchants within the mall. For example, where a bathing suit is displayed from one store—eg Macy's, a pop-up may recommend a beach wrap or sandals from a second store (not shown). Co-marketing arrangements may permit selected discounts for combinations of separately sourced merchandise.

As discussed earlier, the system 100 may maintain user accounts to track information specific to each user. Each user account may maintain a list to keep track of products selected from different ecommerce web pages by the user. The list may be manifested in the form of a shopping cart 520 as illustrated in FIG. 5. For instance, the shopping cart 520 may include items such as "Kenneth Cole Reaction Tiered Ruffle Tankini Top & Hipster" from Macy's, and "Samsung UN55ES8000 55" 3D LED HDTV" from BestBuy, among others. In one embodiment, the shopping cart 520 may be maintained by the system 100, but not by individual merchants. Further, each user account may maintain a wish list to keep track of products selected by the user for further consideration. The wish list may maintain products selected from various ecommerce web pages of different merchants. Similar to the shopping cart 420, the wish list may be maintained by the system 100, but not by individual merchants.

The system 100 may store user accounts to keep track of each user's information. Each user account may be accessible by each user through an authentication process. Each time a user is authenticated, its associated user account may start monitoring the user's activity, e.g., adding or removing products to the shopping cart, or adding products or removing products from the wish list. In one embodiment, the system 100 may keep track of such user's activities via a "cookie." The cookie may refer to data sent from the web page of the system 100 and stored in the user's web browser. Every time the user loads the web page of the system 100, the user's browser may send the cookie back to the system 100 to notify the system 100 of the user's previous activity.

Figure 6:
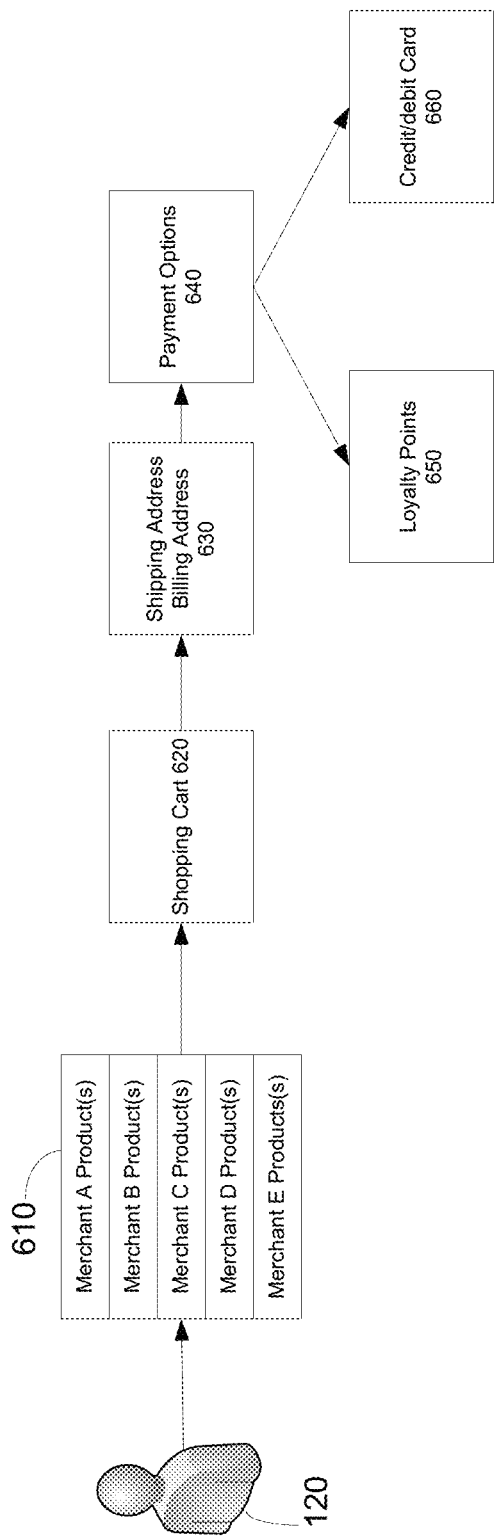
FIG. 6 is a schematic block diagram illustrating a checkout process according to one aspect of the present technology.

FIG. 6 is a schematic block diagram illustrating a checkout process according to one aspect of the present technology. In FIG. 6, a user 120 may add products 610 selected from various Merchants A-E to its shopping cart 620. When the user is ready to submit its purchase order, the system 100 may display a checkout page. The checkout page may display a total purchase price. The total purchase price may include shipping, tax, and other charges. In addition, the checkout page may display a total number of loyalty points equivalent to the total purchase price. The total number of loyalty points may be regarded as a requite number of loyalty points to consummate the purchase. The checkout page may request the user to provide one or more of the following: shipping address and billing address 630. The checkout page may present the user with one or more payment options 640, including but not limited to, loyalty points redemption 650 as a form of payment, or credit card or debit card payment 660. The checkout page may display to the user a total amount of loyalty points available to the user in the user's account.

The checkout page may propose a payment plan for the user's consideration. For instance, a proposed payment plan may include deducting the requisite number of loyalty points from the user's account in exchange for the entire purchase, if the number of the user's loyalty points available for redemption equals to or exceeds the requisite number of loyalty points. Alternatively, if the number of the user's loyalty points available for redemption is less than the requisite number of loyalty points, a proposed payment plan may include redeeming all available loyalty points in exchange for a discount on the total price of the purchase order, and using a debit/credit card to pay the discounted price. The user may consider the proposed payment plan, and may adopt or disregard the proposal. For instance, the user may decide to pay the entire purchase using a regular credit or debit card, and save all available loyalty points for future purchases. In another example, the user may consider a proposed plan, and adjust the number of loyalty points to be redeemed. The user may use all the available points even if they will not cover the full cost of the purchase, or use less than all the available points for partial payment for the purchase order. The user may pay any remaining balance using traditional means, such as a credit/debit card.

Figure 7:
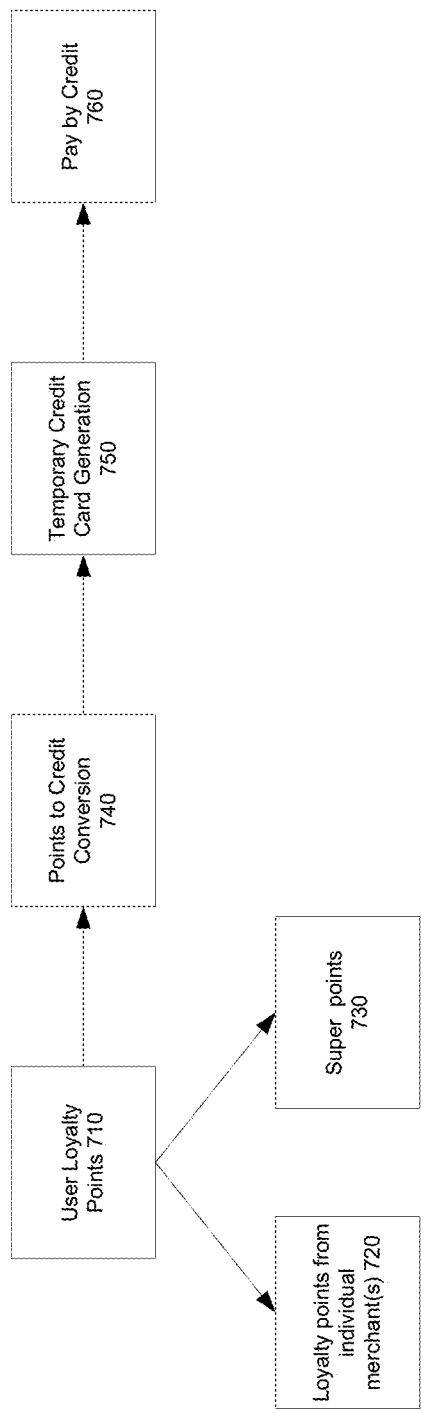
FIG. 7 is an exemplary block diagram illustrating steps for redeeming loyalty points according to one aspect of the present technology.

FIG. 7 is an exemplary block diagram illustrating steps for redeeming loyalty points for a purchase order. As illustrated in FIG. 7, the system 100 may allow the user to redeem loyalty points 710. Loyalty points 710 may include loyalty points gained through loyalty programs offered by various merchants 720, including but not limited to American Express, United Airlines, JetBlue and BestBuy. Loyalty points 701 may also include loyalty points gained through purchases made at the web page managed by the system 100. Such points may be referred to as super points 730.

The system 100 may consolidate one or more loyalty programs. The system 100 may enable the user to use loyalty points or miles gained from a loyalty program sponsored by one merchant to purchase one or more products sold by another merchant. For instance, when shopping at the webpage maintained by the system 100, the user may use JetBlue points to purchase one or more products from Macy's. In another example, the user may use United Airlines miles to purchase one or more products from other merchants including Macy's and BestBuy. In one embodiment, points gained from one loyalty program may be converted to loyalty points of another loyalty program. For instance, the system 100 may coordinate with a third party, such as points.com to exchange loyalty points between different loyalty programs. In some embodiments, the user may also use super points to purchase products from individual merchants.

With continued reference to FIG. 7, once the user decides to use one or more available points for purchases, the system 100 may perform a conversion 740 of the loyalty points to a currency value. U.S. application Ser. No. 13/738,860, entitled "System and Method for Enhanced Commerce" filed on Jan. 10, 2013 discloses detailed implementation algorithms for redeeming loyalty points for purchases, the entirety of which is incorporated herein by reference. According to one embodiment, the system 100 may convert the user's loyalty points to an appropriate currency value based on a conversion rate. The conversion rate may be a pre-arranged exchange ratio. The conversion rate may represent an exchange ratio between loyalty points and currency. The conversion rate may also represent an exchange ratio between miles and currency. The system 100 may store one or more conversion rates, each corresponding to a different loyalty program. The conversion rate may be stored in the memory 104 of the system 100, or a database thereof. Different loyalty programs may offer different conversion rates. For instance, 100 loyalty points from loyalty program 1 may be worth $5, whereas 100 loyalty points from loyalty program 2 may be worth $10.

Once the system 100 determines the currency value corresponding to the loyalty points, the system 100 may display the currency value to the user. Optionally, the user may be presented with the points to currency conversion before accepting the redemption of her points. Once the user decides to proceed with the conversion, or in the absence of the user's objections, the system 100 may deduct the converted loyalty points from the user's account. As illustrated in FIG. 7, the system 100 may also contact a credit card company to generate or issue a temporary credit card number 750 or a one-time credit card having a value identical to the currency value. The system 100 may use the temporary card number to complete the checkout process at 760. According to one embodiment, the system 100 may fill in the temporary card number on the checkout page. In the alternative, the system 100 may present the temporary card number to the user, so that the user may enter the temporary card number into the checkout page.

Figure 8:
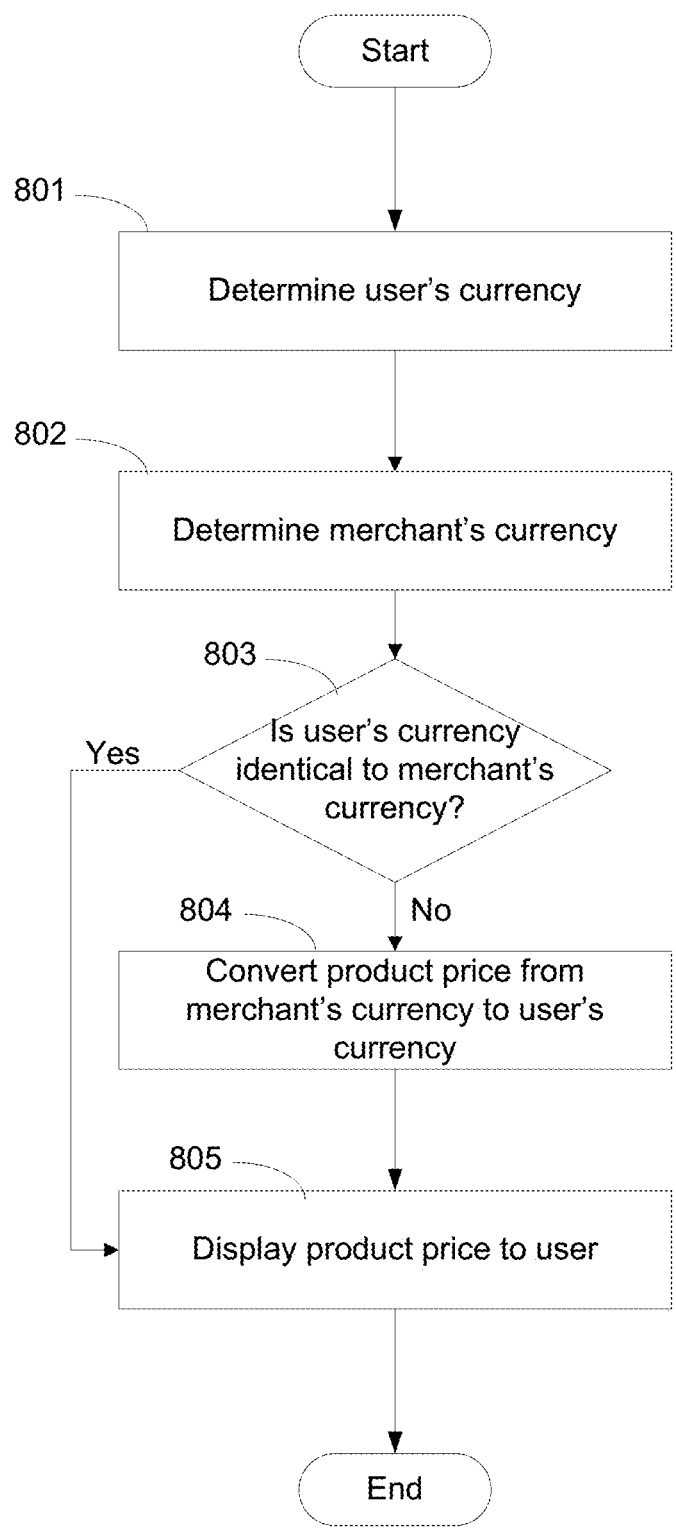
FIG. 8 is a flow chart illustrating steps for displaying product prices to the user according to one aspect of the present technology.

According to one embodiment, the system 100 may display product prices of products offered by one or more merchants using a user's preferred currency. FIG. 8 is a flow chart illustrating steps for displaying product prices to the user. At 802, the system 100 may determine the user's preferred currency based on the user's present address. In the alternative, the system 100 may simply inquire the user about the user's preferred currency. At 804, the system 100 may determine a merchant's currency. By default, a merchant's currency may be U.S. dollars. In some embodiments, each merchant's currency may be pre-known to the system 100. At 803, the system 100 may determine if the user's preferred currency identical to the merchant's currency. If they are identical to each other, the system 100 may proceed to display default product prices of various products offered by the merchant at 805. However, if the user's preferred currency differs from the merchant's currency, the system 100 may convert at 804 product prices of products offered by the merchant from the merchant's currency to the user's preferred currency. Once converted, the system 100 may display the product prices at 805. By way of example, if a user desires to deliver a purchase order to Vienna, the system may display product prices in Euros to the user. When the user makes a purchase, the system 100 may receive the user's payment information and charge the user by the corresponding U.S. dollars.

Figure 9:
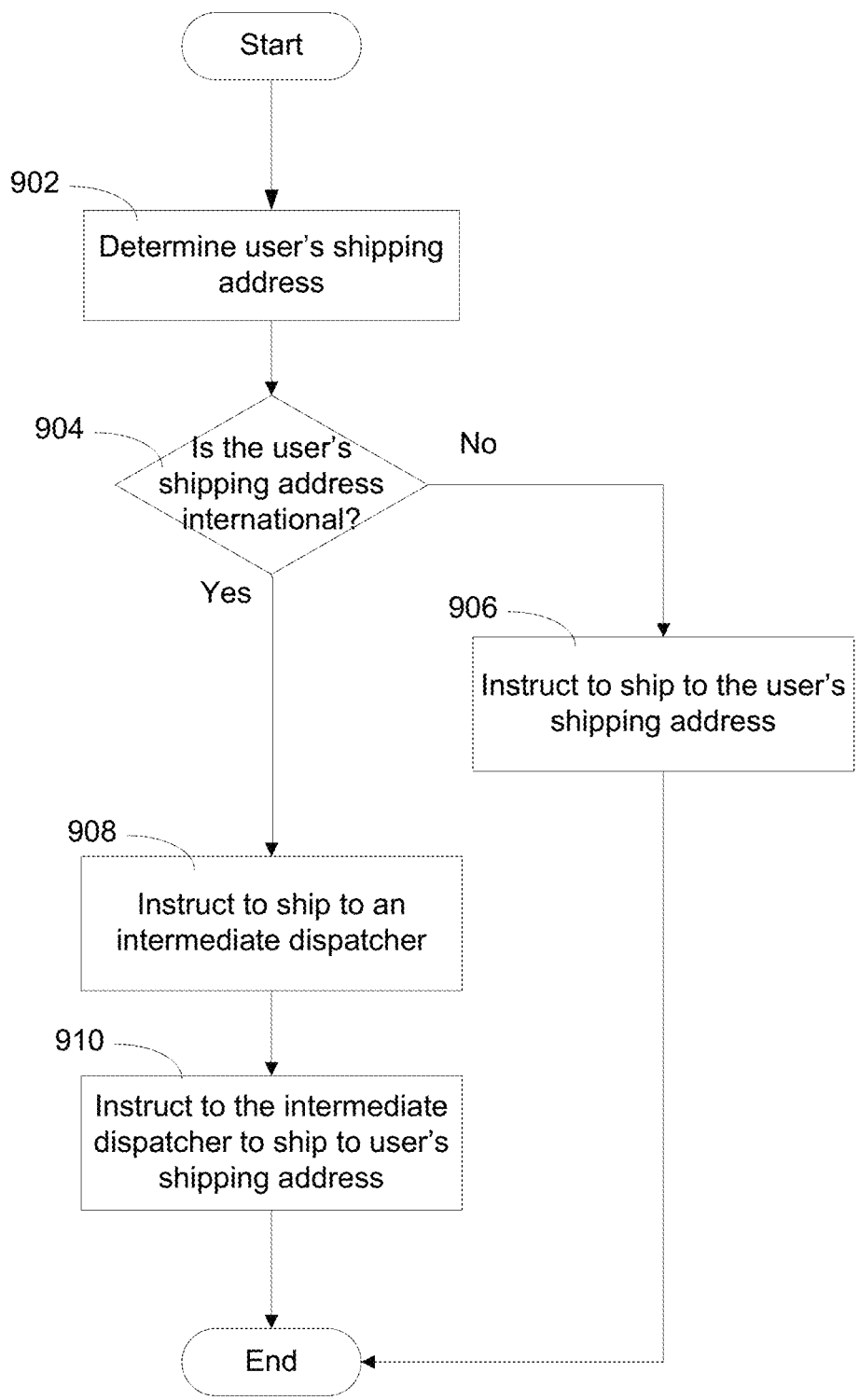
FIG. 9 is a flow chart illustrating steps for handling an international delivery according to one aspect of the present technology.

In some aspects of the present technology, the system 100 may facilitate merchants who exclusively provide domestic deliveries to accomplish international deliveries. FIG. 9 is a flow chart illustrating steps performed by the system 100 in this regard. At 902, the system 100 may determine a user's shipping address based on the user's entry. At 904, the system 100 may determine if the user's shipping address is an international address. At 906, if the user's shipping address is a domestic address, the system 100 may instruct the merchant to ship the user's purchase to the user's shipping address. However, if the user's shipping address is an international address, at 908, the system 100 may instruct the merchant to ship the user's purchase to an intermediate dispatcher, where the intermediate dispatcher has a domestic address, e.g., Las Vegas, Nev. At 910, the system 100 may instruct the intermediate dispatcher to ship the user's purchase to the user's international shipping address. The intermediate dispatcher may be a warehouse having a domestic address. The intermediate dispatcher may receive product(s) from a merchant and dispatch the received product(s) to the user's international shipping address.

Figure 10:
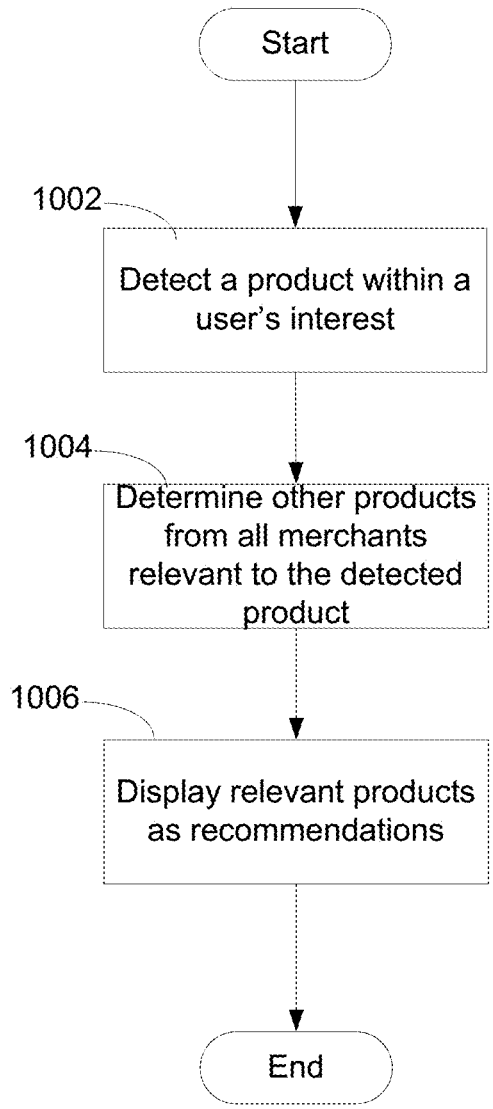
FIG. 10 is a flow chart illustrating steps for making a recommendation to a user according to one aspect of the present technology.

Further, according to some aspects of the present technology, the system 100 may provide recommendations to a user based on one or more products of the user's interest. The system 100 may determine the user's interest based on products in the user's wish list, the user's shopping cart, or the product that is currently displayed to the user. Based on the product of the user's interest, the system 100 may display to the user products related to the product of the user's interest. FIG. 10 is a flow chart illustrating steps performed by the system 100 in this regard. At 1002, the system 100 may detect a product within a user's interest. At 1004, the system 100 may determine products related to the product within the user's interest. For instance, if the product interested by the user is a skirt, then relevant products may include matching shoes, jewelry, and blouses. At 1006, the system 100 may display the determined relevant products as recommendations to the user. By way of example, if user purchases a skirt from Macy's, the system 100 may simply recommend matching products from Macy's or other merchants, including for example matching jewelry and shoes. The matching products may or may not be offered by Macy's. For instance, the matching products may be offered by other merchants.

Figure 11:
FIG. 11 illustrates a graphical user interface of a platform to manage products according to one aspect of the present technology.
Figure 11:
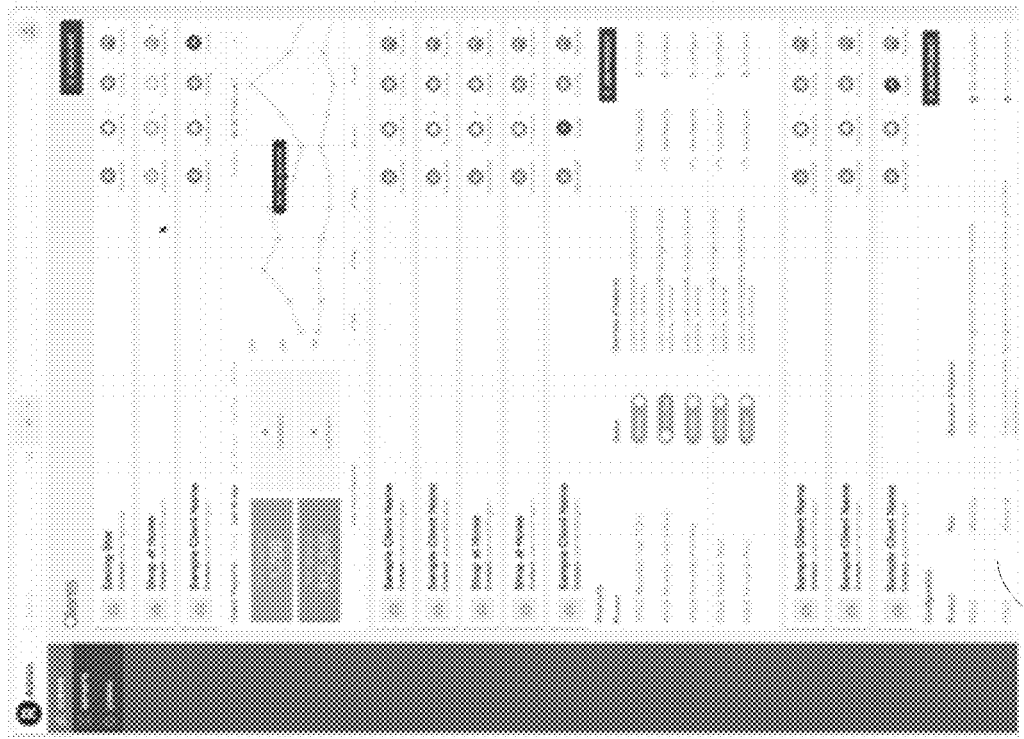

According to some aspects of the present technology, the system 100 may provide a portal that allows merchants and internal developers to manage products in an easy and efficient way. FIG. 11 illustrates a graphical user interface 1100 of such a portal. The portal may serve as a tool or a wizard for rapid development of products. As shown in FIG. 11, the portal may provide reports and analytics of sale activities on the system 100. The portal may also provide advanced reports based on a merchant's request. The portal may implement changes based on a merchant's request. Merchants may control their products and monitor their sale performance via the portal. In particular, direct merchants may use the portal to fully manage their products.

Figure 12:
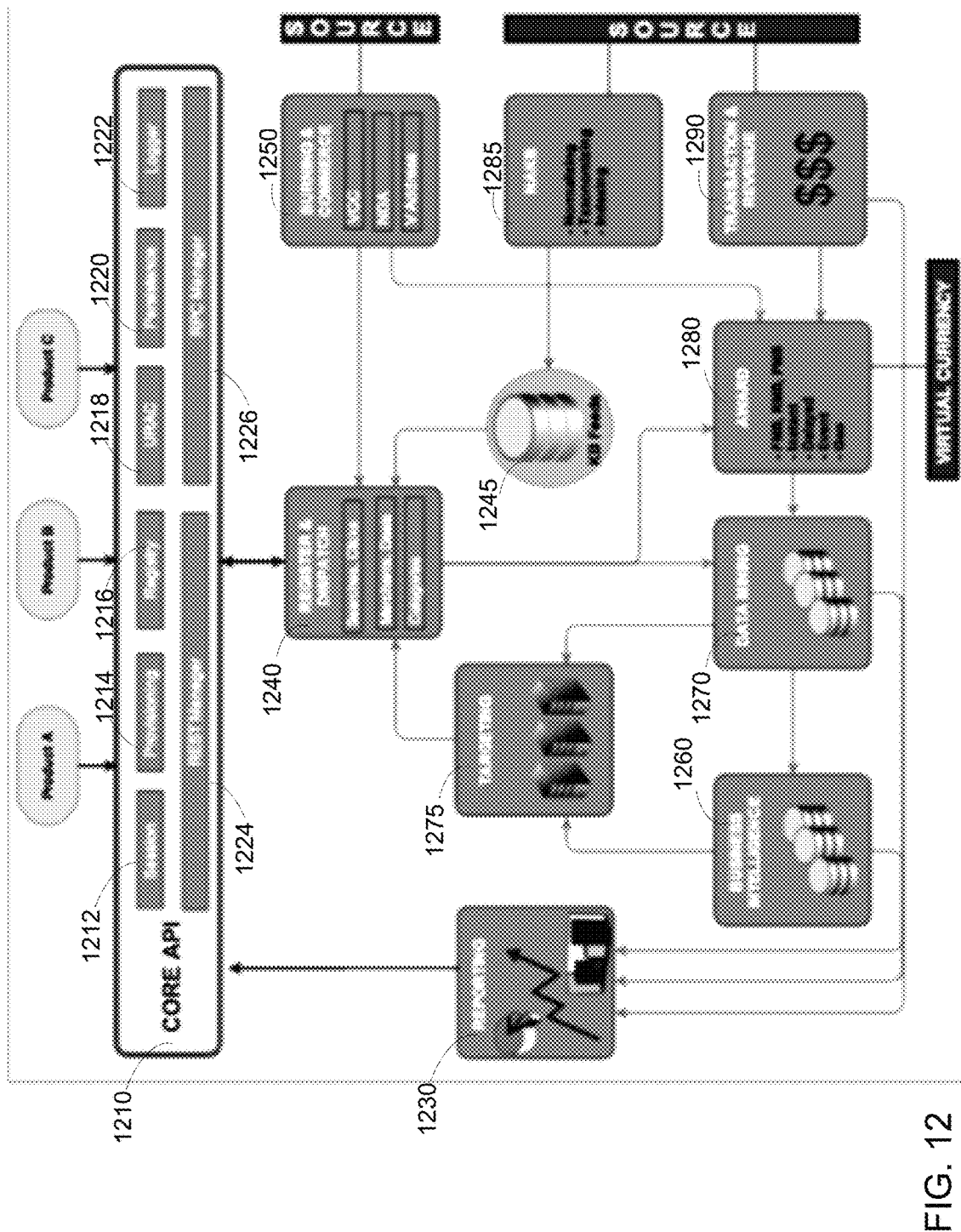
FIG. 12 illustrates the architecture for the operational platform.

Turning now to FIG. 12, a block diagram illustrates an underlying system that may build a dynamic ecommerce platform. The underlying system may be implemented based on a service oriented architecture approach. A shown in FIG.

12, the underlying system may include a core layer 1210 in communication with a plurality of services such as a register and dispatch service 1230, a burning and commerce service 1235, a knowledge base (NAKB) service 1240, a reporting service 1245, a business intelligence service 1250, a data mining service 1255, an award service 1260, a transaction and revenue service 1265, a target service 1270 and a knowledge base feeds service 1275. Each service may be an independent service with a very well defined set of APIs to enable communications to and from the service.

The core layer 1210 may include a session 1212, a provisioning configuration 1214, a registry 1216, a user registration and access control platform (URAC) 1218, a persistence layer 1220, a logger 1222, a rest manager 1224, and a remote procedure call (RPC) manager 1226.

The session 1212 may provide the services with a distributed multitenant session capabilities. The core layer 1210 may store configurations therein, such as all tenant service specific provisioning configurations 1214. The registry 1216 may store all OS, I/O, infrastructure configurations as well as devops and techops needed configurations. The information stored in the registry 1216 may enable creating a successful cloud base service oriented architecture. The URAC 1218 may serve multi-tenant authentication for all properties globally. The URAC 1218 may not only allow membership login and single sign-on (SSO) functionalities, but may also greatly simplify an adoption of new earn and burn opportunities for super points collectors in Japan, the United States and around the world. The URAC 1218 may provide a complete identity management system. The persistence layer 1220 may serve among the services as well as their appropriate data layers throughout the distributed infrastructure. The logger 1222 may include a unified logging mechanism among all the services in order to standardize and capture all kinds of different logs. The logger 1222 may generate analytics and monitor the logs or the analytics to guarantee the quality and the reliability of the entire platform. The rest manager 1224 may orchestrate all restful communications. The RPC manager 1226 may orchestrate all RPC communications.

The core layer 1210 may enable the services to inherit a needed standardization. Detailed discussions with respect to each service are provided herewith.

The register and dispatch service 1230 may serve as one of main interfaces between front-end and back-end products. A principal function of the dispatch side of the product may process a request from front-end products and, based on the content of the request, identify and deliver a set of contents or assets. These assets may include many different content types, such as deals, messages and merchants, among other possibilities. The register side of the product may fill a slightly different role. In some examples, the register service may always generate an event record for events that happen in the front end, including toolbar search, shop click, install and login, among many other possibilities. In some examples, the register service may always include some metadata about an event. The metadata may ideally include a minimum, standardized set, such as application, tenant ID, username, timestamp, IP and Useragent, among many other possibilities. The register service may also include some metadata specific to an event type, such as search keywords and shopping merchant, among many other possibilities. In some examples, the register service may sometimes return data that drive functionality in the front-end application which has triggered the register service.

The burning and commerce service 1235 may include many modules including a Virtual Credit Card (VCC) module, a Virtual Address Generation (VAG) module as well as a DNA module. This service 1235 may add a dynamic integration layer to the platform and provide capabilities to generate dynamic sales as well as dynamic shipments all based on DNA. This service 1235 may allow a user to make purchases at select merchants using the user's loyalty program currency in place of cash. At the moment of a transaction, the user may be informed if the user can affect the purchase using the user's loyalty program currency. The loyalty program currency may be debited via a real-time call to the loyalty program. A virtual card number (VCN) may be obtained from a payment provider. The VCN may be linked to a funded central account or a credit line. The purchase may be completed on the merchant site with the virtual card number (VCN).

The NAKB service 1240 may provide e-Commerce, loyalty and marketing related data feeds, aggregated from multiple sources and intelligently organized. The NAKB service 1240 may collect data that are valuable for both system administrators and clients to create better offerings and enhance revenues. The NAKB service 1240 may fetch raw data related to affiliate advertisers and their deals and products from affiliate networks. The NAKB service 1240 may apply normalizing rules to the data, including but not limited to filtering, data cleansing, translation of merchant categories and deal types into standard taxonomies, before saving the data in the network knowledge base 1275. A network feed may be created or maintained for each network with which the platform integrates.

The reporting service 1245 may provide data grids and charts that are designed both from the data layer up and from the business intelligence layer. By way of example, the reporting service 1245 may provide data points that are available. The reporting service 1245 may also provide information that is necessary to optimize business.

The business intelligence service 1250 may gather, store, access and analyze data to aid in decision-making Generally, this service 1250 may illustrate business intelligence in areas of customer profiling, customer support, market research, market segmentation, product profitability, statistical analysis, and inventory and distribution analysis, among many other possibilities. This service 1250 may integrate data from across the framework and provide reporting and analysis. The business intelligence service 1250 may use a number of analytics features including statistics, data and text mining and predictive analytics to reveal patterns and turn information into insights.

The data mining service 1255 may capture every single event. The service 1255 may have a data model divided into layers. For example, layer 0 may be a raw layer where event data are stored extremely verbose or stored as is. Layer 10 may be where event data are consolidated in a way to satisfy a speed appetite of the systems. In one example, to detect a possible fraud in a fraud management system service in a couple of milliseconds, the data may be massaged and consolidated in a smart way into different layers.

The award service 1260 may award the user and help the user redeem awards. The award service 1280 may include many modules including: a fraud management system (FMS), a rewards management system (RMS) and a point management system (PMS).

The FMS may be more versatile than its name applies. The FMS may evaluate search events and determine whether or not they are valid for purposes of awarding users. The FMS may check, maintain and modify a user-level score. The user-level score may be used in determining validity of searches. In the abstract, the FMS may be a rules engine that performs evaluations and generates metadata about events. The FMS may have a flexible architecture which may allow the FMS to provide additional functionalities in the future.

The RMS may take certain events as inputs, and use internal logic as well as configuration data about a client and a product to calculate an award for a user. The RMS may generate awards through two main models: synchronous and asynchronous models. In synchronous award processing, the RMS may evaluate end-user events and may generate award transactions in real time. One live example of synchronous award processing may be incentivized search. In asynchronous processing, award transactions may be calculated based on events that are not linked to an immediate user action. One live example may be awards on shopping transactions. Transaction data may be pulled from external sources such as Commission Junction, Linkshare, and Pepperjam. The transaction data may be related to an event in the framework system, but may be received after some delay. In asynchronous processing, the RMS may match the transaction data to a previous event in a system (as well as internal rules and client configuration data) to process an award.

The PMS may serve a fairly simple function. The PMS may generate and house award transaction records. An award transaction may be a record internal to the system administrator. The award transaction may not be the same as a transaction record from an affiliate network. The RMS and other systems may interface with the PMS to perform basic functions, such as generating a new award transaction, gathering data about previous award transactions, and updating data in existing award transactions. The PMS may provide information to front-end products about the user-level data, such as points earned from search and history, among other possibilities.

The transaction and revenue service 1265 may include a system that is used to retrieve input from networks such as LinkShare, PepperJam, GAN and Commission Junction, among other possibilities. The service 1265 may standardize records, match them with users' activities so that the users can be rewarded for their online activities. The service 1265 may take care of all kinds of data fetching, normalization and storage. The data retrieved from a network may be normalized into appropriate collections. Afterwards, all of the data may go through different Map Reduce operations that transform the data and normalize them in the Revenues Collection. The Revenues Collection may be finally processed by a Daemon that invokes the Awards System and rewards the users accordingly.

The targeting service 1270 may increase effectiveness of advertisement as well as increase average revenue per user (ARPU). When a user visits a web site, a profile may be created based on pages the user visits, an amount of time the user spends on each page, links the user clicks on, searches made and things that the user interacts with. The profile may be linked to the user's web browser. As a result, such data may be used to create defined audience segments that group users having similar profiles. When the users return to the website, their profiles may be used to position online ads in front of those users who exhibit a greater level of interest and intent for the products and services being offered. The targeting service 1270 may be implemented based on a theory that properly targeted ads may fetch more user interest which, in turn, may increase the ARPU.

The knowledge base feeds service 1275 may include a data layer, which may also be referred to as super feeds. All inventories collected from merchants via an API or collected dynamically, including but not limited to products and deals, may be all collected under the data layer. Lots of indexing techniques and algorithms may be applied to the data layer to improve its speed when fetching the right data feed. The data feed may be sent to the user via the register and dispatch service 1230.

Figure 13:
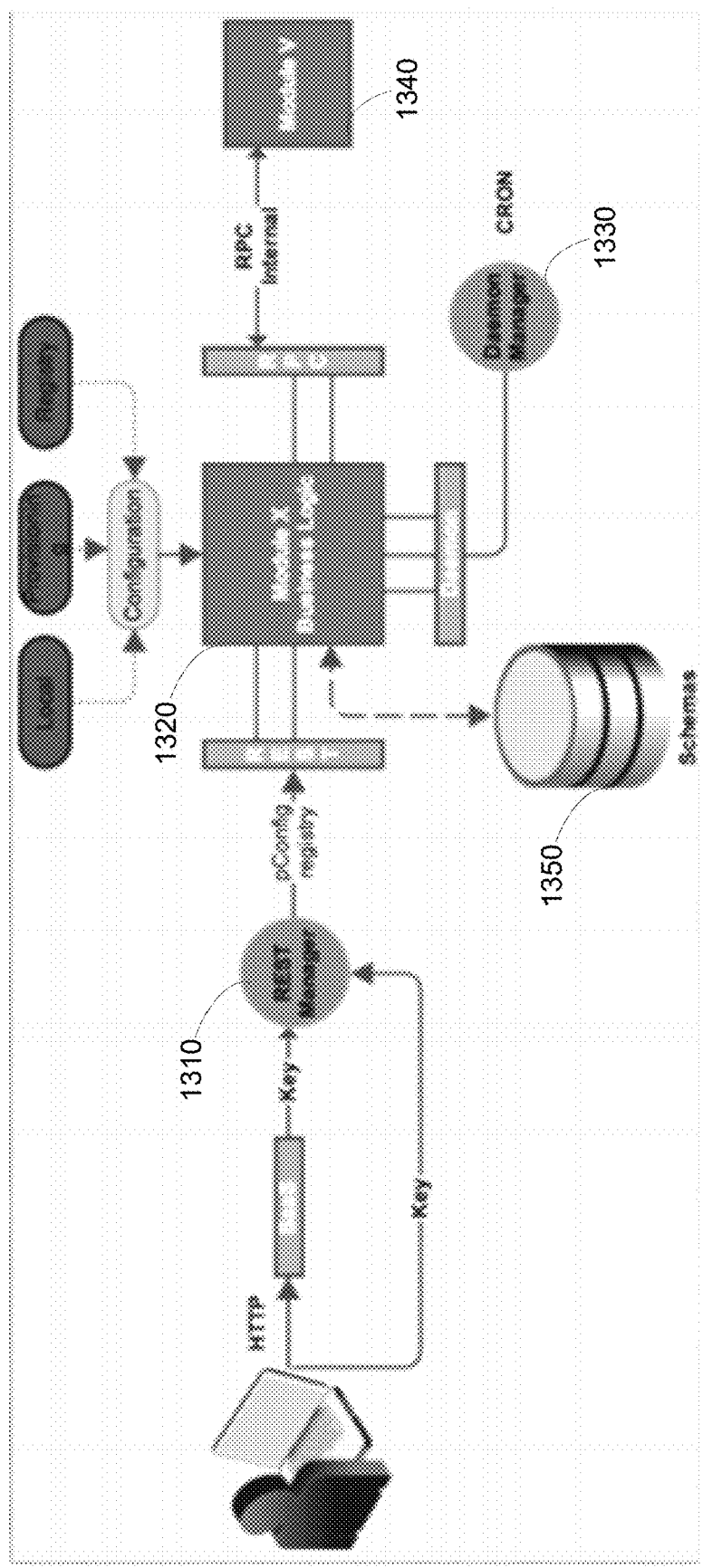
FIG. 13 illustrates the integration of a single store into the multi-merchant platform.

In FIG. 13, a logic/function flow diagram depicts a general process for building new parts to the mall and expanding the platform in a seamless fashion. Operation is sequential. As depicted, a REST manager 1310 may support module x (governing business logic) at block 1320. System schemas may be locally stored at block 1350. Module V block 1340 may support internal RPC.

Figure 14:
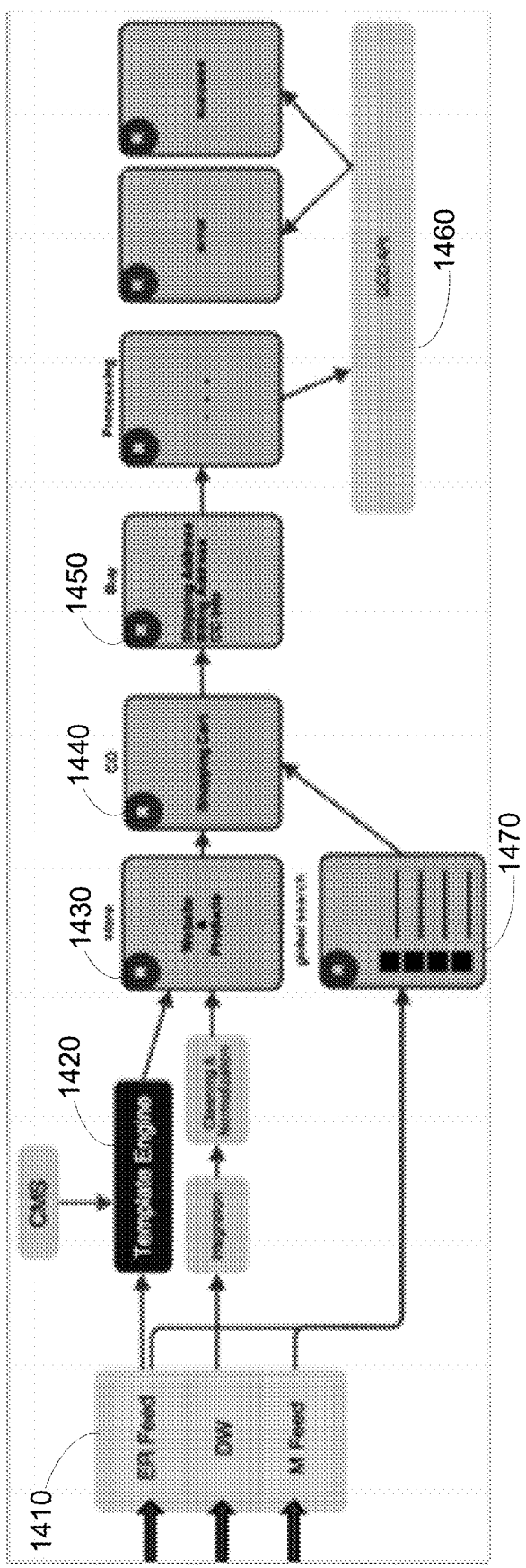
FIG. 14 illustrates the facilities for supporting system expansion.

FIG. 14 depicts a logic flow process for fulfillment operations for the present system. Logic may start with the ER feed and M feed 1410 which may be provided to a template engine 1420 and to a global search block 1470. The template engine 1420 may populate a website store block 1430 and permit use of a shopping cart 1440. Purchase and shipping may be supported by a block 1450, and may be related DCO API block 1460.

Figure 15:
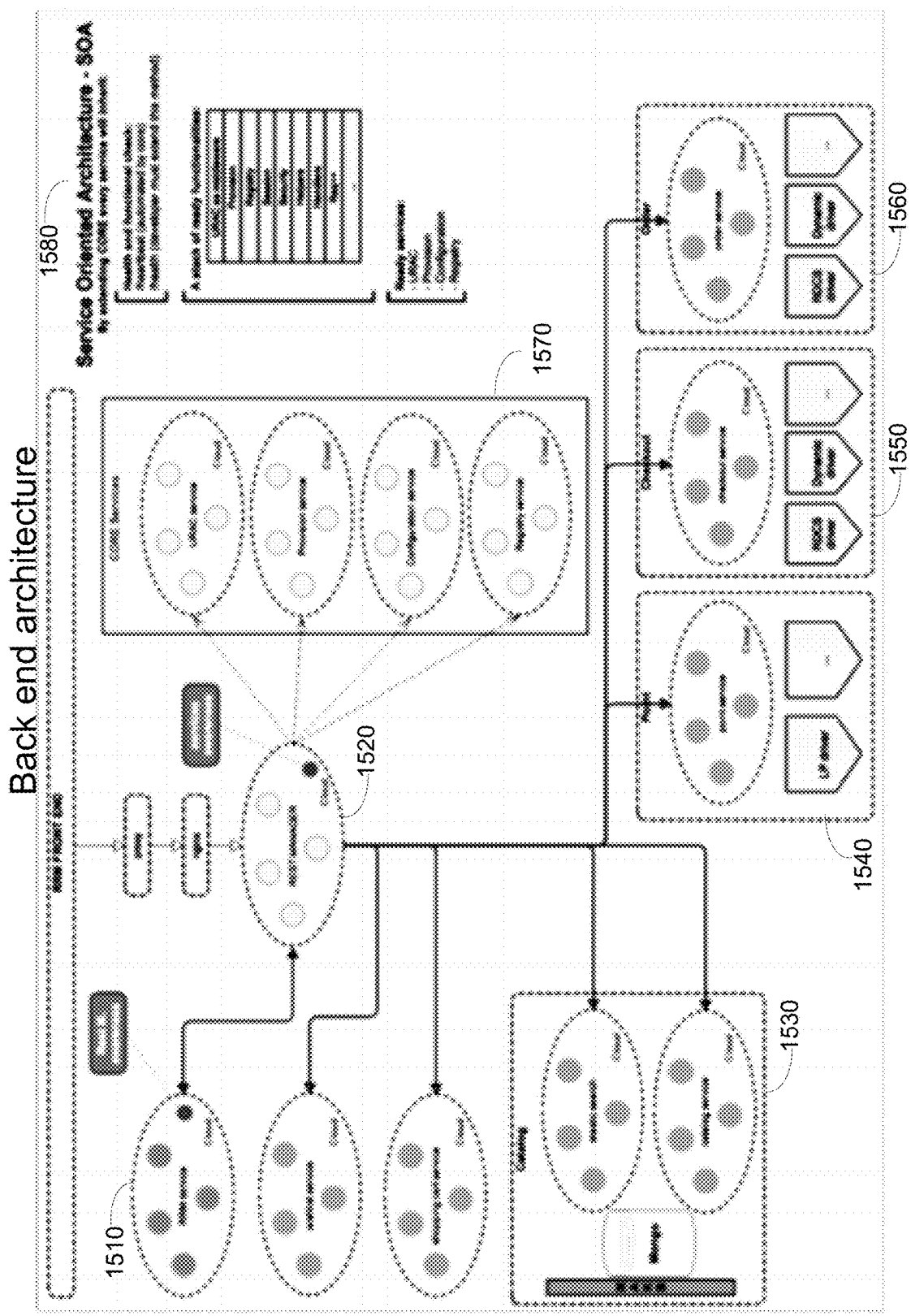
FIG. 15 illustrates a back end architecture for system support.

FIG. 15 depicts a system backend which may support cloud based services 1510. The services 1510 may be connected to the REST manager 1520. Local data storage 1530 may include catalogs linked to a point service 1540, a check-out service 1550, and an order service 1560. The REST manager 1520 may form a link with Core services 1570. An illustrated stack arrangement is depicted at 1580.

The present technology described herein has many advantages. For instance, the online shopping platform described herein may offer a vast variety of products via dynamic and direct integration. The platform may revolutionize and disrupt the existing catalog redemption business by introducing a flexible and easy way to use loyalty points. For instance, the platform may provide universal earning and burning of loyalty points across all different loyalty programs. More specifically, the platform may allow a user to spend loyalty points earned from a first merchant to purchase products from a second merchant, without knowledge of the second merchant. As such, users may use loyalty points earned from a loyalty program outside of limitations set by the loyalty program. The platform may also allow global users to shop without any payment or shipping limitations. The platform may also allow a seamless integration with existing ecommerce infrastructures. Merchants who have or do not have existing ecommerce infrastructures may join the platform without any technical effort.

For ease of illustration, not every step or element of the present technology is described herein as part of software or computer system, but those skilled in the art will recognize that each step or element may have a corresponding computer system or software component. Such computer systems and/or software components are therefore enabled by describing their corresponding steps or elements (that is, their functionality), and are within the scope of the present technology. In addition, various steps and/or elements of the present technology may be stored in a non-transitory storage medium, and selectively executed by a processor.

The flow diagrams disclosed here are mere exemplary illustrations of steps or operations performed in individual processes, operations or methods, such as by a suitable configured controller or processor. The processes may be performed in the precise order as illustrated in the flow diagrams. Alternatively, various steps may be handled simultaneously or performed in sequences different form that illustrated. Steps may also be omitted from or added to the flow diagrams unless otherwise stated.

The system described herein may include a variety of non-transitory computer-readable media. Computer-readable media may be any available media, such as removable and non-removable media. By way of example, computer-readable media may comprise computer storage media and communication media. Computer storage media may store information such as computer-readable instructions, data structures, program modules or other data. Computer storage media may include, but not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which can be accessed by the computer. Communication media may include computer-readable instructions, data structures, program modules or other data in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any one of the above may also be included within the scope of computer-readable media.

Although the present technology has been described with reference to particular embodiments, it is to be understood that these embodiments are merely illustrative of the principles and applications of the present technology. It is therefore understood that numerous modifications may be made to the illustrative embodiments and that other arrangements may be devised without departing from the spirit and scope of the present disclosure as defined by the appended claims.

The invention claimed is:

1. A system for providing a shopping website to a client computer via a network for facilitating sale of products from a plurality of merchants to a user, comprising:
   a memory storing information about the user's loyalty account sponsored by a first merchant; and
   a processor in communication with the memory, the processor configured to:
      maintain the shopping website to display and sell products offered by the plurality of merchants, including the first merchant which has an existing first ecommerce website a second merchant which has an existing second ecommerce website, and a third merchant which has an existing third ecommerce website;
      integrate the shopping website with each existing ecommerce website by an application program interface;
      maintain and display a shopping cart in the shopping website to keep track of any product selected by the user from different existing ecommerce web pages of the existing ecommerce websites of the plurality of merchants;
      display a first web page of the shopping website, the first web page displaying in its view:
         the shopping cart and
         an existing first merchant website display of the first merchant,
         wherein the existing first merchant website display displays a first product of the existing first ecommerce website;
      refresh the shopping website to display a second web page, when the user navigates within the shopping website from the first merchant to the second merchant, the second web page displaying in its view:
         the shopping cart and
         an existing second merchant website display of the second merchant,
         wherein the existing second merchant website display displays a second product of the existing second ecommerce website;
      display a popup recommending a third product offered by the existing third ecommerce web site of the third merchant when the shopping web site displays the second product of the existing second ecommerce web site of the second merchant, wherein purchase of a combination of the second product and the third product receives a selected discount;
      receive the user's selection of the second product offered by the second merchant when the shopping website displays the second web page;
      receive the user's selection of the third product offered by the third merchant when the popup is displayed;
      add the second product and the third product to the shopping cart;
      receive a purchase order to check out the second product and the third product in the shopping cart;
      determine cost of the purchase order after applying the selected discount;
      determine a number of loyalty points available in the user's loyalty account sponsored by the first merchant;
      deduct at least a portion of the available loyalty points from the user's loyalty account in exchange for a currency value; and
      reduce the cost of the purchase order of the second product sold by the second merchant and the third product sold by the third merchant by the currency value exchanged from the loyalty points sponsored by the first merchant.

2. The system of claim 1, wherein the memory stores information about a plurality of loyalty accounts associated with the user, each loyalty account is sponsored by a different merchant, and each loyalty account has a number of loyalty points available for redemption.

3. The system of claim 1, wherein the memory stores a conversion rate for converting one or more loyalty points to a currency value.

4. The system of claim 1, wherein the processor is configured to generate a temporary credit card number having a credit amount corresponding to the currency value, and consummate the purchase order with the temporary credit card number.

5. The system of claim 1, wherein the processor is configured to display the number of loyalty points available in the user's loyalty account.

6. The system of claim 1, wherein the processor is configured to display the reduced cost of the purchase order to the user, and receive payment information from the user to pay the reduced cost.

7. The system of claim 1, wherein the currency value exchanged from the loyalty points is less than or equal to the cost of the purchase order.

8. A method for providing a shopping website to a client computer via a network for facilitating sale of products from a plurality of merchants to a user, comprising:

maintaining the shopping website to display and sell products offered by the plurality of merchants, including a first merchant which has an existing first ecommerce website, a second merchant which has an existing second ecommerce website, and a third merchant which has an existing third ecommerce website;

integrating the shopping website with each existing ecommerce website by an application program interface;

maintaining and displaying a shopping cart in the shopping website to keep track of any product selected by the user from different existing ecommerce web pages of the existing ecommerce websites of the plurality of merchants;

displaying a first web page of the shopping website, the first web page displaying in its view:

the shopping cart and an existing first merchant website display of the first merchant, wherein the existing first merchant website display displays a first product of the existing first ecommerce website;

refreshing the shopping website to display a second web page, when the user navigates within the shopping website from the first merchant to the second merchant, the second web page displaying in its view:

the shopping cart and an existing second merchant website display of the second merchant, wherein the existing second merchant website display displays a second product of the existing second ecommerce website;

displaying a popup recommending a third product offered by the existing third ecommerce website of the third merchant when the shopping website displays the second product of the existing second ecommerce website of the second merchant, wherein purchase of a combination of the second product and the third product receives a selected discount;

retrieving, from a memory, a number of loyalty points available in the user's loyalty account sponsored by the first merchant;

receiving, by a processor, the user's selection of the second product offered by the second merchant when the shopping website displays the second web page;

receiving, by the processor, the user's selection of the third product offered by the third merchant when the popup is displayed;

adding the second product and the third product to the shopping cart;

receiving a purchase order to check out the second product and the third product in the shopping cart;

determining cost of the purchase order after applying the selected discount;

deducting at least a portion of the loyalty points available in the user's loyalty account sponsored by the first merchant in exchange for a currency value; and reducing the cost of the purchase order of the second product sold by the second merchant and the third product sold by the third merchant by the currency value exchanged from the loyalty points sponsored by the first merchant.

9. The method of claim 8, wherein the memory stores information about a plurality of loyalty accounts associated with the user, each loyalty account is sponsored by a different merchant, and each loyalty account has a number of loyalty points available for redemption.

10. The method of claim 8, wherein the memory stores a conversion rate for converting one or more loyalty points to a currency value.

11. The method of claim 8, further comprising generating a temporary credit card number having a credit amount corresponding to the currency value, and consummating the purchase order with the temporary credit card number.

12. The method of claim 8, further comprising displaying the number of loyalty points available in the user's loyalty account.

13. The method of claim 8, further comprising displaying the reduced cost of the purchase order to the user, and receiving payment information from the user to pay the reduced cost.

14. The method of claim 8, wherein the currency value exchanged from the loyalty points is less than or equal to the cost of the purchase order.

15. A system for providing an online shopping website to a client computer via a network for facilitating sale of products from a plurality of merchants to a user, comprising:

a memory storing information about: a user's loyalty account configured to accumulate loyalty points for redemption; and a processor in communication with the memory, the processor configured to:

maintain the shopping website to display and sell products offered by the plurality of merchants, including the first merchant which has an existing first ecommerce website, a second merchant which has an existing second ecommerce website, and a third merchant which has an existing third ecommerce website;

integrate the shopping website with each existing ecommerce website by an application program interface;

maintain and display a shopping cart in the shopping website to keep track of any product selected by the user from different existing ecommerce web pages of the existing ecommerce websites of the plurality of merchants;

display a first web page of the shopping website, the first web page displaying in its view:

the shopping cart and an existing first merchant website display of the first merchant, wherein the existing first merchant website display displays a first product of the existing first ecommerce website;

receive the user's selection of the first product offered by the first merchant for purchase when the shopping website displays the first web page;

add the first product to the shopping cart;

refresh the shopping website to display a second web page, when the user navigates within the shopping website from the first merchant to the second merchant, the second web page displaying in its view:

the shopping cart and an existing second merchant website display of the second merchant, wherein the existing second merchant website display displays a second product of the existing second ecommerce website;

display a popup recommending a third product from the existing third ecommerce website of the third merchant when the shopping website displays the second product of the existing second ecommerce website of the second merchant, wherein purchase of a combination of the second product and the third product receives a selected discount;

receive the user's selection of the second product offered by the second merchant for purchase when the shopping website displays the second web page;

add the second product to the shopping cart;

display a number of loyalty points available in the user's loyalty account;

receive a purchase order, placed by the user, to check out the first product and the second product in the shopping cart;

calculate cost of the purchase order;

deduct at least a portion of the loyalty points available in the user's loyalty account in exchange for a currency value; and reduce the cost of the purchase order by the currency value.

16. The system of claim 15, wherein the memory stores information about a plurality of loyalty accounts associated with the user, each loyalty account is sponsored by a different merchant, and each loyalty account has a number of loyalty points available for redemption.

17. The system of claim 15, wherein the memory stores a conversion rate for converting one or more loyalty points to a currency value.

18. The system of claim 15, wherein the processor is configured to generate a temporary credit card number having a credit amount corresponding to the currency value, and consummate the purchase with the temporary credit card number.

19. The system of claim 15, wherein the processor is configured to display the reduced cost of the purchase order to the user, and receive payment information from the user to pay the reduced cost.

20. The system of claim 15, wherein the currency value exchanged from the loyalty points is less than or equal to the cost of the purchase order.

21. A method for providing an online shopping website to a client computer via a network for facilitating sale of products from a plurality of merchants to a user, comprising:

maintaining the shopping website to display and sell products offered by the plurality of merchants, including the first merchant which has an existing first ecommerce website, a second merchant which has an existing second ecommerce website, and a third merchant which has an existing third ecommerce website;

integrating the shopping website with each existing ecommerce website by an application program interface;

maintaining and displaying a shopping cart in the shopping website to keep track of any product selected by the user from different existing ecommerce web pages of the existing ecommerce websites of the plurality of merchants;

displaying a first web page of the shopping website, the first web page displaying in its view:
the shopping cart and
an existing first merchant website display of the first merchant,
wherein the existing first merchant website display displays a first product of the existing first ecommerce website;

receiving the user's selection of a first product offered by the first merchant for purchase when the shopping website displays the first web page;

adding the first product to the shopping cart;

refreshing the shopping website to display a second web page, when the user navigates within the shopping website from the first merchant to the second merchant, the second web page displaying in its view:
the shopping cart and
an existing second merchant website display of the second merchant,
wherein the existing second merchant website display displays a second product of the existing second ecommerce website;

displaying a popup recommending a third product from the existing third ecommerce website of the third merchant when the shopping website displays the second product of the existing second ecommerce web site of the second merchant, wherein purchase of a combination of the second product and the third product receives a selected discount;

receiving the user's selection of the second product offered by the second merchant for purchase when the shopping website displays the second web page;

adding the second product to the shopping cart;

retrieving, from a memory, a number of loyalty points available in a user's loyalty account;

receiving a purchase order, placed by the user, to check out the first product and the second product;

calculating cost of the purchase order;

deducting at least a portion of the loyalty points available in the user's loyalty account in exchange for a currency value; and reducing the cost of the purchase order by the currency value.

22. The method of claim 21, further comprising displaying the number of loyalty points available in the user's loyalty account.

23. The method of claim 21, wherein the memory stores information about a plurality of loyalty accounts associated with the user, each loyalty account is sponsored by a different merchant, and each loyalty account has a number of loyalty points available for redemption.

24. The method of claim 21, wherein the memory stores a conversion rate for converting one or more loyalty points to a currency value.

25. The method of claim 21, further comprising generating a temporary credit card number having a credit amount corresponding to the currency value, and consummating the purchase with the temporary credit card number.

26. The method of claim 21, further comprising displaying the reduced cost of the purchase order to the user, and receiving payment information from the user to pay the reduced cost.

27. The method of claim 21, wherein the currency value exchanged from the loyalty points is less than or equal to the cost of the purchase order.

* * * * *